(12) United States Patent
Tuttle

(10) Patent No.: US 8,018,340 B2
(45) Date of Patent: Sep. 13, 2011

(54) SYSTEM AND METHOD TO TRACK ARTICLES AT A POINT OF ORIGIN AND AT A POINT OF DESTINATION USING RFID

(75) Inventor: John R. Tuttle, Corrales, NM (US)

(73) Assignee: Round Rock Research, LLC, Mt. Kisco, NY (US)

(*) Notice: Subject to any disclaimer, the term of this patent is extended or adjusted under 35 U.S.C. 154(b) by 95 days.

(21) Appl. No.: 11/585,691

(22) Filed: Oct. 24, 2006

(65) Prior Publication Data

US 2007/0040685 A1 Feb. 22, 2007

Related U.S. Application Data

(60) Continuation of application No. 10/705,685, filed on Nov. 10, 2003, now Pat. No. 7,158,031, which is a continuation of application No. 09/481,807, filed on Jan. 11, 2000, now Pat. No. 6,741,178, which is a division of application No. 08/934,701, filed on Sep. 22, 1997, now Pat. No. 6,013,949, which is a continuation of application No. 08/610,236, filed on Mar. 4, 1996, now abandoned, which is a continuation of application No. 08/168,909, filed on Dec. 17, 1993, now Pat. No. 5,497,140, which is a continuation of application No. 07/928,899, filed on Aug. 12, 1992, now abandoned.

(51) Int. Cl.
*G08B 13/14* (2006.01)

(52) U.S. Cl. ............... 340/572.1; 340/572.4; 340/572.7; 340/572.8; 340/573.1; 340/870.16; 342/44; 342/50; 235/375; 235/382; 235/492

(58) Field of Classification Search ............... 340/572.1, 340/572.4, 572.7, 572.8, 573.1, 825.3, 870.16; 342/44, 50; 235/492, 375, 382
See application file for complete search history.

(56) References Cited

U.S. PATENT DOCUMENTS 3,573,705 A 4/1971 Magi
(Continued)

FOREIGN PATENT DOCUMENTS

BE 530614 A 10/1957
(Continued)

OTHER PUBLICATIONS

Casson, K., et al., "High Temperature Packaging: Flip Chip on Flexible Laminate", *Surface Mount Technology*, pp. 19-20 (Jan. 1992).

(Continued)

*Primary Examiner* — Tai T Nguyen
(74) *Attorney, Agent, or Firm* — Lerner, David, Littenberg, Krumholz & Mentlik, LLP

(57) ABSTRACT

A system is provided, which may alternatively be implemented as a method. According to one embodiment, the system comprises an article to be tracked; a flexible radio frequency identification (RFID) device coupled to the article, the RFID device comprising a first thin flexible sheet having a first surface, a dipole antenna disposed on the first sheet, and a single integrated circuit (IC) having stored therein an identification code associated with the article. The system further comprises an article tracking system configured to receive the identification code from an interrogation system, wherein the interrogation system includes a first interrogator located at a point of origin of the article, a second interrogator located at a point of destination of the article, and a third interrogator located on a route between the point of origin and the point of destination, and wherein the first, second, and third interrogators are configured to communicate with the RFID device to determine the identification code.

30 Claims, 7 Drawing Sheets

U.S. PATENT DOCUMENTS

| | | | |
|---|---|---|---|
| 3,660,916 A | 5/1972 | McDermott et al. | |
| 3,701,317 A | 10/1972 | Miyamoto et al. | 101/170 |
| 3,702,464 A | 11/1972 | Catrucci | |
| 3,706,094 A | 12/1972 | Cole et al. | 342/44 |
| 3,709,459 A | 1/1973 | Bushrod | |
| 3,711,848 A | 1/1973 | Martens | |
| 3,721,990 A | 3/1973 | Gibson et al. | |
| 3,750,167 A | 7/1973 | Gehman et al. | 342/44 |
| 3,780,368 A | 12/1973 | Northeved et al. | 342/44 |
| 3,832,530 A | 8/1974 | Reitbock et al. | 342/44 |
| 3,849,633 A | 11/1974 | Reitbock et al. | 235/487 |
| 3,858,031 A | 12/1974 | Kornfeld | |
| 3,947,930 A | 4/1976 | Martens et al. | |
| 3,981,761 A | 9/1976 | Kojima et al. | 156/235 |
| 4,013,894 A * | 3/1977 | Foote et al. | 250/569 |
| 4,049,969 A | 9/1977 | Salonimer et al. | 356/5 |
| 4,051,161 A | 9/1977 | Proskow | |
| 4,065,343 A | 12/1977 | Stumpe | |
| 4,067,011 A | 1/1978 | Althaus | |
| 4,068,232 A | 1/1978 | Meyers et al. | |
| 4,075,632 A | 2/1978 | Baldwin et al. | 343/68 R |
| 4,129,855 A | 12/1978 | Rodrian | |
| 4,135,184 A | 1/1979 | Pruzick | 340/572 |
| 4,158,434 A | 6/1979 | Peterson | |
| 4,173,019 A | 10/1979 | Williams | |
| 4,177,466 A | 12/1979 | Reagan | |
| 4,188,629 A * | 2/1980 | Johnson | 342/46 |
| 4,208,005 A | 6/1980 | Nate et al. | |
| 4,226,361 A | 10/1980 | Taylor | |
| 4,232,512 A | 11/1980 | Yoshikawa et al. | 368/82 |
| 4,242,663 A | 12/1980 | Slobodin | |
| 4,262,631 A | 4/1981 | Kubacki | |
| 4,313,119 A | 1/1982 | Garay et al. | |
| 4,331,957 A | 5/1982 | Enander et al. | 342/22 |
| 4,396,917 A | 8/1983 | Tucker | |
| 4,399,441 A | 8/1983 | Vaughan et al. | 342/50 |
| 4,412,356 A | 10/1983 | Klaus et al. | 455/603 |
| 4,413,254 A | 11/1983 | Pinneo et al. | 340/572 |
| 4,418,411 A | 11/1983 | Strietzel | 340/870.16 |
| 4,442,430 A | 4/1984 | Schneider | |
| 4,453,074 A | 6/1984 | Weinstein | |
| 4,470,883 A | 9/1984 | Eichelberger et al. | |
| 4,471,344 A | 9/1984 | Williams | |
| 4,484,098 A | 11/1984 | Cullen et al. | |
| 4,484,355 A | 11/1984 | Henke et al. | 455/76 |
| 4,506,148 A | 3/1985 | Berthold et al. | 235/380 |
| 4,509,053 A | 4/1985 | Robin et al. | |
| 4,539,472 A | 9/1985 | Poetker et al. | 235/488 |
| 4,560,445 A | 12/1985 | Hoover et al. | |
| 4,587,038 A | 5/1986 | Tamura | |
| 4,603,326 A | 7/1986 | Freed | |
| 4,605,813 A | 8/1986 | Takeuchi et al. | |
| 4,608,323 A | 8/1986 | Zaborney | |
| 4,612,409 A | 9/1986 | Hamakawa et al. | |
| 4,615,959 A | 10/1986 | Hayashi et al. | |
| 4,621,190 A | 11/1986 | Saito et al. | |
| 4,631,546 A | 12/1986 | Dumas et al. | |
| 4,634,849 A | 1/1987 | Klingen | |
| 4,649,233 A | 3/1987 | Bass et al. | |
| 4,656,463 A | 4/1987 | Anders et al. | |
| 4,656,478 A | 4/1987 | Leuenberger | |
| 4,658,264 A | 4/1987 | Baker | |
| 4,680,724 A | 7/1987 | Sugiyama et al. | |
| 4,686,358 A | 8/1987 | Seckinger et al. | |
| 4,709,201 A | 11/1987 | Schaefer et al. | |
| 4,724,427 A | 2/1988 | Carroll | 340/572 |
| 4,727,560 A | 2/1988 | Van Zanten et al. | 377/60 |
| 4,737,789 A | 4/1988 | Nysen | |
| 4,742,340 A | 5/1988 | Nowik et al. | 340/572 |
| 4,745,401 A | 5/1988 | Montean | |
| 4,746,392 A | 5/1988 | Hoppe | |
| 4,746,618 A | 5/1988 | Nath et al. | 437/2 |
| 4,746,830 A | 5/1988 | Holland | 310/313 |
| 4,751,513 A | 6/1988 | Daryoush et al. | |
| 4,756,717 A | 7/1988 | Sturgis et al. | 427/290 |
| 4,761,778 A | 8/1988 | Hui | |
| 4,773,942 A | 9/1988 | Hamakawa et al. | |
| 4,777,563 A | 10/1988 | Teraoka et al. | 361/395 |
| 4,780,791 A | 10/1988 | Morita et al. | |
| 4,783,646 A | 11/1988 | Matsuzaki | 340/572 |
| 4,797,948 A | 1/1989 | Milliorn et al. | |
| 4,799,059 A | 1/1989 | Grindahl et al. | |
| 4,814,777 A | 3/1989 | Monser | |
| 4,814,943 A | 3/1989 | Okuaki | |
| 4,827,110 A | 5/1989 | Rossi et al. | 235/376 |
| 4,827,395 A | 5/1989 | Anders et al. | 364/138 |
| 4,830,038 A | 5/1989 | Anderson et al. | |
| 4,839,642 A | 6/1989 | Batz et al. | |
| 4,843,225 A | 6/1989 | Hoppe | |
| 4,845,504 A | 7/1989 | Roberts et al. | |
| 4,853,705 A | 8/1989 | Landt | |
| 4,854,328 A | 8/1989 | Pollack | 128/736 |
| 4,855,583 A | 8/1989 | Fraser et al. | |
| 4,857,893 A | 8/1989 | Carroll | 340/572 |
| 4,862,160 A | 8/1989 | Ekchian et al. | |
| 4,862,176 A | 8/1989 | Voles | |
| 4,866,453 A | 9/1989 | Nagy et al. | |
| 4,870,419 A | 9/1989 | Baldwin et al. | |
| 4,882,294 A | 11/1989 | Christenson | |
| 4,884,208 A | 11/1989 | Marinelli et al. | |
| 4,888,591 A | 12/1989 | Landt et al. | |
| 4,894,663 A | 1/1990 | Urbish et al. | |
| 4,903,326 A | 2/1990 | Zakman et al. | |
| 4,908,502 A | 3/1990 | Jackson | |
| 4,908,629 A | 3/1990 | Apsell et al. | |
| 4,910,521 A | 3/1990 | Mellon | |
| 4,911,217 A | 3/1990 | Dunn et al. | 152/152.1 |
| 4,918,425 A | 4/1990 | Greenberg et al. | |
| 4,918,631 A | 4/1990 | Hara et al. | 364/708 |
| 4,922,263 A | 5/1990 | Dubost et al. | |
| 4,924,237 A | 5/1990 | Honda et al. | |
| 4,926,182 A | 5/1990 | Ohta et al. | 342/44 |
| 4,935,093 A | 6/1990 | Reeb | |
| 4,939,792 A | 7/1990 | Urbish et al. | |
| 4,940,959 A | 7/1990 | Zeller et al. | |
| 4,942,327 A | 7/1990 | Watanabe et al. | 310/313 R |
| 4,955,018 A | 9/1990 | Twitty et al. | |
| 4,956,645 A | 9/1990 | Guena et al. | |
| 4,960,983 A | 10/1990 | Inoue | 235/449 |
| 4,962,415 A * | 10/1990 | Yamamoto et al. | 257/679 |
| 4,969,146 A | 11/1990 | Twitty et al. | |
| 4,975,221 A | 12/1990 | Chen et al. | |
| 4,981,672 A | 1/1991 | de Neufville et al. | |
| 4,983,987 A | 1/1991 | Woloszczuk | |
| 5,008,776 A | 4/1991 | Queyssac | 361/392 |
| 5,013,900 A | 5/1991 | Hoppe | |
| 5,019,813 A | 5/1991 | Kip et al. | |
| 5,020,136 A | 5/1991 | Patsiokas et al. | |
| 5,023,573 A | 6/1991 | Adam | 333/17.2 |
| 5,025,486 A | 6/1991 | Klughart | |
| 5,030,807 A | 7/1991 | Landt et al. | |
| 5,030,940 A | 7/1991 | Siikarla | |
| 5,046,066 A | 9/1991 | Messenger | |
| 5,054,120 A | 10/1991 | Ushiyama et al. | |
| 5,055,659 A | 10/1991 | Hendrick et al. | |
| 5,055,968 A | 10/1991 | Nishi et al. | 361/395 |
| 5,059,951 A * | 10/1991 | Kaltner | 340/572.3 |
| 5,061,943 A | 10/1991 | Rammos | |
| 5,065,160 A | 11/1991 | Kawakami | |
| 5,068,894 A | 11/1991 | Hoppe | |
| 5,075,691 A | 12/1991 | Garay et al. | |
| 5,095,240 A | 3/1992 | Nysen et al. | 310/313 |
| 5,103,166 A | 4/1992 | Jeon et al. | |
| 5,112,253 A | 5/1992 | Swift | |
| 5,115,223 A | 5/1992 | Moody | |
| 5,119,102 A | 6/1992 | Barnard | |
| 5,121,407 A | 6/1992 | Partyka et al. | |
| 5,124,697 A | 6/1992 | Moore | |
| 5,124,733 A | 6/1992 | Haneishi | |
| 5,124,782 A | 6/1992 | Hundt et al. | 257/724 |
| 5,134,277 A | 7/1992 | Yerbury et al. | 250/214 |
| 5,138,651 A | 8/1992 | Sudo | |
| 5,142,270 A | 8/1992 | Appalucci et al. | |
| 5,144,261 A | 9/1992 | Harvey et al. | |
| 5,144,313 A | 9/1992 | Kirknes | |
| 5,144,314 A | 9/1992 | Malmberg et al. | 342/44 |
| 5,144,668 A | 9/1992 | Malek et al. | |

| | | | |
|---|---|---|---|
| 5,148,355 A | 9/1992 | Lowe et al. ............... 361/410 |
| 5,148,504 A | 9/1992 | Levi et al. ................ 385/14 |
| 5,150,114 A | 9/1992 | Johansson |
| 5,150,310 A | 9/1992 | Greenspun et al. |
| 5,151,684 A | 9/1992 | Johnsen |
| 5,151,946 A | 9/1992 | Martensson |
| 5,153,710 A | 10/1992 | McCain ................... 357/75 |
| 5,153,836 A | 10/1992 | Fraughton et al. |
| 5,162,172 A | 11/1992 | Kaun |
| 5,164,732 A | 11/1992 | Brockelsby et al. ............ 342/44 |
| 5,164,985 A | 11/1992 | Nysen et al. |
| 5,166,502 A | 11/1992 | Rendleman et al. ........ 235/492 |
| 5,168,510 A | 12/1992 | Hill |
| 5,170,173 A | 12/1992 | Krenz et al. |
| 5,175,418 A | 12/1992 | Tanaka .................... 235/439 |
| 5,192,947 A | 3/1993 | Neustein |
| 5,194,860 A | 3/1993 | Jones et al. |
| 5,196,374 A | 3/1993 | Hundt et al. |
| 5,200,362 A | 4/1993 | Lin et al. |
| 5,202,829 A | 4/1993 | Geier |
| 5,206,495 A | 4/1993 | Kreft ...................... 235/492 |
| 5,208,756 A | 5/1993 | Song |
| 5,214,410 A | 5/1993 | Verster ................... 340/572 |
| 5,218,343 A | 6/1993 | Stobbe et al. |
| 5,218,374 A | 6/1993 | Koert et al. |
| 5,221,925 A | 6/1993 | Cross |
| 5,223,844 A | 6/1993 | Mansell et al. |
| 5,227,264 A | 7/1993 | Duval et al. |
| 5,227,804 A | 7/1993 | Oda |
| 5,231,273 A | 7/1993 | Caswell et al. |
| 5,231,646 A | 7/1993 | Heath et al. |
| 5,250,843 A | 10/1993 | Eichelberger |
| 5,252,783 A | 10/1993 | Baird |
| 5,266,925 A | 11/1993 | Vercellotti et al. ........... 340/572 |
| 5,274,221 A | 12/1993 | Matsubara ................ 235/492 |
| 5,280,159 A | 1/1994 | Schultz et al. |
| 5,283,423 A | 2/1994 | Venambre et al. |
| 5,294,068 A | 3/1994 | Baro et al. |
| 5,302,954 A * | 4/1994 | Brooks et al. ............... 342/44 |
| 5,307,463 A | 4/1994 | Hyatt et al. |
| 5,313,052 A * | 5/1994 | Watanabe et al. ........... 235/375 |
| 5,313,211 A * | 5/1994 | Tokuda et al. ............. 342/50 |
| 5,317,309 A | 5/1994 | Vercellotti et al. ........... 340/825 |
| 5,323,150 A | 6/1994 | Tuttle |
| 5,326,652 A | 7/1994 | Lake |
| 5,337,063 A | 8/1994 | Takahira .................. 343/741 |
| 5,340,968 A | 8/1994 | Watanabe et al. ........... 235/380 |
| 5,347,263 A | 9/1994 | Carroll et al. ............... 340/825 |
| 5,350,645 A | 9/1994 | Lake et al. |
| 5,362,421 A | 11/1994 | Kropp et al. |
| 5,365,551 A | 11/1994 | Snodgrass et al. |
| 5,373,503 A | 12/1994 | Chen |
| 5,376,943 A | 12/1994 | Blunden et al. |
| 5,392,049 A | 2/1995 | Gunnarsson |
| 5,392,052 A | 2/1995 | Eberwine |
| 5,399,847 A | 3/1995 | Droz |
| 5,400,039 A | 3/1995 | Araki et al. |
| 5,402,095 A | 3/1995 | Janniere ................... 235/441 |
| 5,406,263 A | 4/1995 | Tuttle |
| 5,410,749 A | 4/1995 | Siwiak et al. |
| 5,412,192 A | 5/1995 | Hoss ...................... 235/380 |
| 5,414,221 A | 5/1995 | Gardner |
| 5,414,427 A | 5/1995 | Gunnarsson ............... 342/825 |
| 5,414,432 A | 5/1995 | Penny, Jr. et al. |
| 5,416,423 A | 5/1995 | De Borde |
| 5,428,214 A | 6/1995 | Hakkers et al. ............. 235/492 |
| 5,432,027 A | 7/1995 | Tuttle et al. |
| 5,432,841 A | 7/1995 | Rimer |
| 5,434,397 A | 7/1995 | Diehl et al. |
| 5,442,367 A | 8/1995 | Naito et al. |
| 5,448,110 A | 9/1995 | Tuttle et al. ................ 257/723 |
| 5,469,363 A | 11/1995 | Saliga |
| 5,480,462 A | 1/1996 | Tuttle |
| 5,480,834 A | 1/1996 | Lake et al. |
| 5,480,842 A | 1/1996 | Clifton et al. |
| 5,483,827 A | 1/1996 | Kulka et al. ............... 73/146.5 |
| 5,486,431 A | 1/1996 | Tuttle et al. |
| 5,491,482 A | 2/1996 | Dingwall et al. |
| 5,494,495 A | 2/1996 | Tuttle |
| 5,495,250 A | 2/1996 | Ghaem et al. |
| 5,497,140 A | 3/1996 | Tuttle ..................... 342/51 |
| 5,497,168 A | 3/1996 | Thomas et al. |
| 5,500,650 A | 3/1996 | Snodgrass et al. |
| 5,510,074 A | 4/1996 | Rose |
| 5,528,222 A | 6/1996 | Moskowitz et al. .......... 340/572 |
| 5,530,753 A | 6/1996 | Easter et al. |
| 5,532,024 A | 7/1996 | Arndt et al. |
| 5,537,105 A | 7/1996 | Marsh et al. |
| 5,541,399 A | 7/1996 | De Vall ................... 235/491 |
| 5,550,547 A | 8/1996 | Chan et al. |
| 5,552,790 A | 9/1996 | Gunnarsson |
| 5,558,679 A | 9/1996 | Tuttle |
| 5,566,441 A | 10/1996 | Marsh et al. ............... 29/600 |
| 5,569,879 A | 10/1996 | Gloton et al. |
| 5,572,226 A | 11/1996 | Tuttle .................... 343/726 |
| 5,574,470 A | 11/1996 | deValle ................... 343/895 |
| 5,583,850 A | 12/1996 | Snodgrass et al. |
| 5,598,032 A | 1/1997 | Fidalgo ................... 257/679 |
| 5,600,175 A | 2/1997 | Orthmann ................. 257/532 |
| 5,601,941 A | 2/1997 | Tuttle |
| 5,603,157 A | 2/1997 | Lake et al. |
| 5,605,467 A | 2/1997 | Beck et al. |
| 5,605,547 A | 2/1997 | Lake |
| 5,612,513 A | 3/1997 | Tuttle et al. |
| 5,614,278 A | 3/1997 | Chamberlain et al. |
| 5,619,066 A | 4/1997 | Curry et al. |
| 5,621,412 A | 4/1997 | Sharpe et al. .............. 342/51 |
| 5,621,913 A | 4/1997 | Tuttle et al. |
| 5,624,468 A | 4/1997 | Lake |
| 5,627,544 A | 5/1997 | Snodgrass et al. |
| 5,642,103 A | 6/1997 | Tokuda et al. |
| 5,646,592 A | 7/1997 | Tuttle |
| 5,647,122 A | 7/1997 | Launay et al. ............. 29/840 |
| 5,649,295 A | 7/1997 | Shober et al. |
| 5,649,296 A | 7/1997 | MacLellan et al. ......... 455/38.2 |
| 5,652,070 A | 7/1997 | Blonsky et al. |
| 5,660,663 A | 8/1997 | Chamberlain et al. |
| 5,682,143 A | 10/1997 | Brady et al. |
| 5,708,419 A | 1/1998 | Isaacson et al. |
| 5,719,586 A | 2/1998 | Tuttle et al. ............... 343/726 |
| RE35,746 E | 3/1998 | Lake |
| 5,725,967 A | 3/1998 | Tuttle |
| 5,728,473 A | 3/1998 | Inoue et al. |
| 5,729,053 A | 3/1998 | Orthmann ................. 257/724 |
| 5,735,040 A | 4/1998 | Ochi et al. ................ 29/841 |
| 5,757,021 A | 5/1998 | Dewaele |
| 5,767,503 A | 6/1998 | Gloton |
| 5,776,278 A | 7/1998 | Tuttle et al. .............. 156/213 |
| 5,779,839 A | 7/1998 | Tuttle et al. .............. 156/213 |
| 5,783,465 A | 7/1998 | Canning et al. |
| 5,786,626 A | 7/1998 | Brady et al. |
| 5,787,174 A | 7/1998 | Tuttle |
| 5,793,305 A | 8/1998 | Turner et al. |
| 5,809,633 A | 9/1998 | Mundigl et al. ............. 29/600 |
| 5,815,120 A | 9/1998 | Lawrence et al. |
| 5,817,207 A | 10/1998 | Leighton |
| 5,820,716 A | 10/1998 | Tuttle |
| 5,826,328 A | 10/1998 | Brady et al. |
| 5,841,770 A | 11/1998 | Snodgrass et al. |
| 5,843,251 A | 12/1998 | Tsukagoshi et al. |
| 5,850,690 A | 12/1998 | Launay et al. ............. 29/841 |
| 5,859,587 A | 1/1999 | Alicot et al. |
| 5,865,657 A | 2/1999 | Haven et al. |
| 5,867,102 A | 2/1999 | Souder et al. |
| 5,880,934 A | 3/1999 | Haghiri-Tehrani .......... 361/737 |
| 5,880,937 A | 3/1999 | Schadhauser et al. ........ 361/794 |
| 5,884,425 A | 3/1999 | Baldwin |
| 5,909,050 A | 6/1999 | Furey et al. |
| 5,937,512 A | 8/1999 | Lake et al. |
| 5,939,984 A | 8/1999 | Brady et al. |
| 5,955,949 A | 9/1999 | Cocita .................... 340/572 |
| 5,963,132 A | 10/1999 | Yoakum |
| 5,970,393 A | 10/1999 | Khorrami et al. |
| 5,972,152 A | 10/1999 | Lake et al. |
| 5,973,598 A | 10/1999 | Beigel |
| 5,982,284 A | 11/1999 | Baldwin et al. ............ 340/572 |
| 5,988,510 A | 11/1999 | Tuttle et al. |
| 5,995,048 A | 11/1999 | Smithgall et al. |

| | | |
|---|---|---|
| 6,002,344 A | 12/1999 | Bandy et al. |
| 6,013,949 A | 1/2000 | Tuttle |
| 6,027,027 A | 2/2000 | Smithgall |
| 6,028,564 A | 2/2000 | Duan et al. |
| 6,030,423 A | 2/2000 | Lake |
| 6,032,799 A | 3/2000 | Bellum et al. |
| 6,036,099 A | 3/2000 | Leighton ............ 235/488 |
| 6,043,745 A | 3/2000 | Lake |
| 6,045,652 A | 4/2000 | Tuttle et al. |
| 6,049,278 A | 4/2000 | Guthrie et al. |
| 6,049,461 A | 4/2000 | Haghiri-Tehrani et al. |
| 6,052,062 A | 4/2000 | Tuttle |
| 6,078,791 A | 6/2000 | Tuttle et al. |
| 6,096,153 A | 8/2000 | Nowaczyk |
| 6,100,804 A | 8/2000 | Brady et al. |
| 6,104,311 A | 8/2000 | Lastinger |
| 6,118,379 A | 9/2000 | Kodukula et al. |
| 6,123,796 A | 9/2000 | Kathmann et al. |
| 6,130,602 A | 10/2000 | O'Toole et al. ........... 340/10.33 |
| 6,133,836 A | 10/2000 | Smith |
| 6,144,916 A | 11/2000 | Wood, Jr. et al. |
| 6,220,516 B1 | 4/2001 | Tuttle et al. |
| 6,229,441 B1 | 5/2001 | Lake |
| 6,265,977 B1 | 7/2001 | Vega et al. ............... 340/572 |
| 6,271,801 B2 | 8/2001 | Tuttle et al. |
| 6,294,998 B1 | 9/2001 | Adams et al. ............. 340/572 |
| 6,325,294 B2 | 12/2001 | Tuttle et al. |
| 6,329,213 B1 | 12/2001 | Tuttle et al. |
| 6,333,693 B1 | 12/2001 | Smith |
| 6,339,385 B1 | 1/2002 | Tuttle |
| 6,359,588 B1 | 3/2002 | Kuntzsch |
| 6,375,780 B1 | 4/2002 | Tuttle et al. |
| 6,396,458 B1 | 5/2002 | Cockson et al. |
| 6,478,229 B1 | 11/2002 | Epstein |
| 6,514,367 B1 | 2/2003 | Leighton ............... 156/153 |
| 6,690,402 B1 | 2/2004 | Waller et al. |
| 6,741,178 B1 | 5/2004 | Tuttle |
| 6,881,294 B2 | 4/2005 | Lake |
| 6,885,089 B2 | 4/2005 | Lake |
| 6,956,538 B2 | 10/2005 | Moore |
| 6,980,085 B1 | 12/2005 | Dando |
| 7,106,201 B2 | 9/2006 | Tuttle |
| 7,158,031 B2 | 1/2007 | Tuttle |
| 7,262,609 B2 | 8/2007 | Reynolds |
| 7,265,674 B2 | 9/2007 | Tuttle |
| RE40,137 E | 3/2008 | Tuttle et al. |
| 7,649,463 B2 | 1/2010 | Tuttle |
| 2004/0166827 A1 | 8/2004 | Lake |
| 2005/0242964 A1 | 11/2005 | Tuttle |
| 2006/0097849 A1 | 5/2006 | Dando |
| 2007/0007345 A1 | 1/2007 | Tuttle |
| 2007/0040685 A1 | 2/2007 | Tuttle |
| 2007/0290812 A1 | 12/2007 | Tuttle |
| 2007/0290862 A1 | 12/2007 | Tuttle |
| 2007/0290863 A1 | 12/2007 | Tuttle |
| 2008/0129510 A1 | 6/2008 | Tuttle |
| 2008/0291027 A1 | 11/2008 | Lake |

FOREIGN PATENT DOCUMENTS

| | | |
|---|---|---|
| DE | 32 48 385 A1 | 6/1984 |
| DE | 3313481 A1 | 10/1984 |
| DE | 3717109 A1 | 12/1987 |
| DE | 38 24 870 A1 | 4/1989 |
| DE | 4120265 A1 | 6/1991 |
| DE | 3201065 | 7/1993 |
| DE | 4431605 | 3/1996 |
| EP | 0 595 549 A3 | 10/1993 |
| EP | 0 682 321 | 5/1995 |
| GB | 1567784 | 5/1980 |
| GB | 2310977 A | 9/1997 |
| JP | 55041028 A | 3/1980 |
| JP | 1-191082 | 8/1989 |
| JP | 2021557 A | 1/1990 |
| JP | 2-36476 | 3/1990 |
| JP | 2-179794 | 7/1990 |
| JP | 2179795 A | 7/1990 |
| JP | 2257648 | 10/1990 |
| JP | 02257648 A | 10/1990 |
| JP | 3-224799 | 10/1991 |
| JP | 4075191 A | 3/1992 |
| JP | 4106865 A | 4/1992 |
| JP | 4-359183 | 11/1992 |
| JP | 07-022831 | 1/1995 |
| JP | 7-200766 A | 8/1995 |
| JP | 8-7066 | 1/1996 |
| JP | 8-96090 A | 4/1996 |
| JP | 8-111573 | 4/1996 |
| JP | 1996111573 A | 4/1996 |
| JP | 8-138022 | 5/1996 |
| JP | 8267974 A | 10/1996 |
| JP | 2000339437 A | 12/2000 |
| WO | WO 90/07858 | 7/1990 |
| WO | 9103921 A1 | 3/1991 |
| WO | WO 96/07985 | 3/1996 |
| WO | 9849653 A1 | 11/1998 |
| ZA | 93/1752 | 3/1993 |

OTHER PUBLICATIONS

Johnson, R.W., "Polymer Thick Films: Technology and Materials", *Circuits Manufacturing* (reprint), 4 pp. (Jul. 1982).

Gilleo, K., "Using SM Devices on Flexible Circuitry", *Electri-Onics*, pp. 20-23 (Mar. 1986).

Kanatzibis, Mercouri G., "Conductive Polymers", *Chemical and Engineering News—American Chemical Society*, pp. 36-54 (Dec. 1990).

Tuttle, Mark E., U.S. Appl. No. 08/538,826, entitled "Method for Surface Mounting Electrical Components to a Substrate," filed Oct. 5, 1995, now abandoned. cited by other.

Tuttle, Mark E., U.S. Appl. No. 08/147,495, entitled "Method for Surface Mounting Electrical Components to a Substrate," filed Nov. 5, 1993, now abandoned. cited by other.

Tuttle, Mark E., U.S. Appl. No. 08/515,128, entitled "Battery Container and Method of Manufacture," filed Aug. 15, 1995, now abandoned. cited by other.

Tuttle, John R., U.S. Appl. No. 08/806,158, entitled "System for Locating an Individual in a Facility," filed Feb. 25, 1997, now abandoned. cited by other.

The New IEEE Standard Dictionary of Electrical and Electronics Terms, 5th edition, p. 662, 1993. cited by other.

Merriam-Webster Collegiate Dictionary, p. 563, 1993. cited by other.

International Application No. PCT/US98/008902, International Search Report, Jun. 10, 1998. cited by other.

Capetanakis, John I., "Generalized TDMA: the Multi-Accessing Tree Protocol," IEEE Transactions on Information Theory, vol. Com. 27, No. 10, pp. 1476-1484, Oct. 1979. cited by other.

Capetanakis, John I., "Tree Algorithms for Packet Broadcast Channels", IEEE Transactions on Information Theory, vol. IT-25, No. 5, pp. 505-515, Sep. 1979. cited by other.

Chang, C-C et al., "Remote Password Authentication With Smart Cards," IEEE Proceedings, Computers and Digital Techniques, vol. 138, No. 3, pp. 165-167, May 1991. cited by other.

Crabtree, R.P., "Software Serial Number" IBM Technical Disclosure Bulletin, vol. 26, No. 7B, pp. 3918-3919, Dec. 1983. cited by other.

Felts, J.T., "Transparent Barrier Coatings Update: Flexible Substrates," Society of Vacuum Coaters, 36th Annual Technical Conference Proceedings, pp. 324-331, 1993. cited by other.

Felts, J.T., "Transparent Gas Barrier Technologies," Airco Coating Technology, Concord CA, mailed by Airco to Mark Tuttle on Sep. 21, 1993. cited by other.

Gu et al., "Effect of Deposition Conditions for G-Aminopropyltriethoxy Silane on Adhesion Between Copper and Epxoy Resins," Applied Surface Science, vol. 115, No. 1, pp. 66-73, 1997. cited by other.

Humblet, Pierre A. et al., "Efficient Accessing of a Multiaccess Channel," Proceedings of the 19th IEEE Conference on Decision and Control including the Symposium on Adaptive Processes, pp. 624-627, 1980. cited by other.

Hwang, T. et al., "Non-Interactive Password Authentications Without Password Tables," Proceedings of the IEEE Region 10 Conference on Computer and Communication Systems (TENCON 90), vol. 1, pp. 429-431, Sep. 1990. cited by other.

Kraus, John, "Antennas," Second Edition, McGraw-Hill Inc., New York, pp. 460-477, 716-725, 1988. cited by other.
Lin et al, "Synthesis of Novel Trifunctional Epoxy Resins and Their Modification with Polydimethylsiloxane for Electronic Application," Polymer, vol. 38, No. 8, pp. 1997-2003, 1997. cited by other.
Miszczyk et al., "Laboratory Evaluation of Epoxy Coatings with an Adhesion Promotor by Impedance," Progress in Organic Coatings, vol. 25, No. 4, pp. 357-363, 1995. cited by other.
Nelson, R.J., "Plasma Enhanced Chemcial Vapor Deposition of SiOx Coatings for Gas Diffusion Barrier Enhancement of Flexible Polymerized Compounds," Society for Research of Polymerized Compounds Surfaces, Fukui City, Japan, Jul. 9, 1993. cited byother.
Pierce, C. W., "Epitaxy," VSLI Technology; S.M. Sze. Editor, McGraw-Hill Book Co., pp. 55, 1988,1983 (copy submitted in parent U.S. Appl. No. 08/947,681). cited by other.
Rice, J. "Silica-Coated Films To Go Commercial in '93," Food Processing, Oct. 1992. cited by other.
Shamir, Adi, "Identity-Based Cryptosystems and Signature Schemes," Advances in Cryptology: Proc. Crypto 84, pp. 47-53, 1984. cited by other.
Wolf, Jack Keil, "Principles of Group Testing and an Application to the Design and Analysis of Multi-Access Protocols," Nato Asi Series E, Applied Sciences, No. 91, pp. 237-257, 1985. cited by other.
Dow Corning Corporation, "Information About Dow Corning Z-6040 Silane," product information brochure, 1996. cited by other.
Letter from Micron Communications, Inc. to Mr. David Reed, U.S. Department of Transportation, Mar. 12, 1996. cited by other.
Micron Communications, Inc. invoice No. 17-4620AR, Apr. 11, 1995. cited by other.
"Beta Test Site and Non-Disclosure Agreement" between Micron Communications, Inc. and U.S. Department of Transportation, May 27, 1993. cited by other.
DOT Contract No. DTRS-57-93-C-0081, Jun. 16, 1993. cited by other.
DOT Contract No. DTRS-57-93-C-0081 , Modification No. 1, Aug. 8, 1994. cited by other.
"VNTSC Intransit GPS Tag System General Description," sent by Micron Communications, Inc. to its subcontractor Compunetics (2 pages), Aug. 18, 1994. cited by other.
"VNTSC Intransit GPS Tag System General Description," sent by Micron Communications, Inc. to its subcontractor Compunetics (2 pages), Oct. 7, 1994. cited by other.
USPTO Transaction History of U.S. Appl. No. 07/899,777, filed Jun. 17, 1992, entitled "Radio Frequency Identification Device (RFID) and Method of Manufacture, Including an Electrical Operating System and Method," now abandoned. cited by other.
USPTO Transaction History of U.S. Appl. No. 07/928,899, filed Aug. 12, 1992, entitled "Electrically Powered Postage Stamp or Mailing or Shipping Label Operative With Radio Frequency (RF) Communication," now abandoned. cited by other.
USPTO Transaction History of U.S. Appl. No. 07/990,915, filed Dec. 15, 1992, entitled "Data Communication Method Using Identification Protocol," now U.S. Patent No. 5,500,650. cited by other.
USPTO Transaction History of U.S. Appl. No. 07/990,918, filed Dec. 15, 1992, entitled "Data Communication System Using Identification Protocol," now U.S. Patent No. 5,365,551. cited by other.
USPTO Transaction History of U.S. Appl. No. 08/008,529, filed Jan. 25, 1993, entitled "Battery Package and Method Using Flexible Polymer Films Having Deposited Layer of an Inorganic Material," now U.S. Patent No. 5,326,652. cited by other.
USPTO Transaction History of U.S. Appl. No. 08/123,030, filed Sep. 14, 1993, entitled "Enclosed Transceiver," now U. S. Patent No. 5,448,110. cited by other.
USPTO Transaction History of U.S. Appl. No. 08/137,677, filed Oct. 14, 1993, entitled "Method of Manufacturing an Enclosed Transceiver," now abandoned. cited by other.
USPTO Transaction History of U.S. Appl. No. 08/168,909, filed Dec. 17, 1993, entitled "Electrically Powered Postage Stamp or Mailing or Shipping Label Operative With Radio Frequency (RF) Communication," now U.S. Patent No. 5,497,140. cited by other.
USPTO Transaction History of U.S. Appl. No. 08/263,210, filed Jun. 21, 1994, entitled "Data Communication System Using Identification Protocol," now U.S. Patent No. 5,583,850. cited by other.
USPTO Transaction History of U.S. Appl. No. 08/489,185, filed Jun. 9, 1995, entitled "Enclosed Transceiver," now abandoned. cited by other.
USPTO Transaction History of U.S. Appl. No. 08/556,818, filed Nov. 2, 1995, entitled "Remote Identification of Integrated Circuit," now U.S. Patent No. 5,787,174. cited by other.
USPTO Transaction History of U.S. Appl. No. 08/581,937, filed Jan. 2, 1996, entitled "Itinerary Monitoring System for Storing a Plurality of Itinerary Data Points," now U.S. Patent No. 6,144,916. cited by other.
USPTO Transaction History of U.S. Appl. No. 08/602,686, filed Feb. 16, 1996, entitled "Method of Manufacturing an Enclosed Transceiver," now abandoned. cited by other.
USPTO Transaction History of U.S. Appl. No. 08/610,236, filed Mar. 4, 1996, entitled "Miniature Radio Frequency Transceiver," now abandoned. cited by other.
USPTO Transaction History of U.S. Appl. No. 08/619,274, filed Mar. 18, 1996, entitled "Data Communication Method Using Identification Protocol," now U.S. Patent No. 5,627,544. cited by other.
USPTO Transaction History of U.S. Appl. No. 08/675,729, filed Jul. 3, 1996, entitled "Battery Package and Method Using Flexible Polymer Films Having Deposited Layer of an Inorganic Material," now U.S. Patent No. RE35,746. cited by other.
USPTO Transaction History of U.S. Appl. No. 08/726,560, filed Oct. 7, 1996, entitled "Data Communication System Using Identification Protocol," now U.S. Patent No. 5,841,770. cited by other.
USPTO Transaction History of U.S. Appl. No. 08/781,107, filed Jan. 9, 1997, entitled "Method of Manufacturing an Enclosed Transceiver," now U.S. Patent No. 5,776,278. cited by other.
USPTO Transaction History of U.S. Appl. No. 08/908,134, filed Aug. 6, 1997, entitled "Radio Frequency Identification Transceiver and Antenna," now U.S. Patent No. 6,078,791. cited by other.
USPTO Transaction History of U.S. Appl. No. 08/934,701, filed Sep. 22, 1997, entitled "Miniature Radio Frequency Transceiver," now U.S. Patent No. 6,013,949. cited by other.
USPTO Transaction History of U.S. Appl. No. 08/947,681, filed Sep. 26, 1997, entitled "Method of Manufacturing an Enclosed Transceiver," now U.S. Patent No. 5,779,839. cited by other.
USPTO Transaction History of U.S. Appl. No. 09/008,215, filed Jan. 16, 1998, entitled "Method of Manufacturing an Enclosed Transceiver," now U.S. Patent No. 6,220,516. cited by other.
USPTO Transaction History of U.S. Appl. No. 09/115,492, filed Jul. 14, 1998, entitled "Method of Manufacturing an Enclosed Transceiver," now U.S. Patent No. 6,045,652. cited by other.
USPTO Transaction History of U.S. Appl. No. 09/481,807, filed Jan. 11, 2000, entitled "Electrically Powered Postage Stamp or Mailing or Shipping Label Operative With Radio Frequency (RF) Communication," now U.S. Patent No. 6,741,178. cited by other.
USPTO Transaction History of U.S. Appl. No. 09/542,625, filed Apr. 4, 2000, entitled "Method of Manufacturing an Enclosed Transceiver," now U.S. Patent No. 6,375,780. cited by other.
USPTO Transaction History of U.S. Appl. No. 09/775,716, filed Feb. 1, 2001, entitled "Method of Manufacturing an Enclosed Transceiver," now U.S. Patent No. 6,325,294. cited by other.
USPTO Transaction History of U.S. Appl. No. 10/705,685, filed Nov. 10, 2003, entitled "Thin, Flexible, RFID Label and System for Use," now U.S. Patent No. 7,158,031. cited by other.
USPTO Transaction History of U.S. Appl. No. 10/729,584, filed Dec. 4, 2003, entitled "Method of Manufacturing an Enclosed Transceiver." cited by other.
USPTO Transaction History of U.S. Appl. No. 11/175,803, filed Jul. 5, 2005, entitled "Method of Manufacturing a Thin, Flexible RFID Device." cited by other.
USPTO Transaction History of U.S. Appl. No. 11/206,350, filed Aug. 18, 2005, entitled "Thin, Flexible, RFID Labels and System for Use," now U.S. Patent No. 7,265,674. cited by other.
USPTO Transaction History of U.S. Appl. No. 11/585,691, filed Oct. 24, 2006, entitled "Miniature Radio Frequency Transceiver." cited by other.
USPTO Transaction History of U.S. Appl. No. 11/848,008, filed Aug. 30, 2007, entitled "Radio Frequency Identification Device and Method." cited by other.

USPTO Transaction History of U.S. Appl. No. 11/848,011, filed Aug. 30, 2007, entitled "Radio Frequency Identification Device and Method." cited by other.

USPTO Transaction History of U.S. Appl. No. 11/848,017, filed Aug. 30, 2007, entitled "Method of Manufacturing a Thin, Flexible RFID Device." cited by other.

USPTO Transaction History of U.S. Appl. No. 11/849,868, filed Sep. 4, 2007, entitled "RFID Tags and Systems." cited by other.

USPTO Transaction History of U.S. Appl. No. 11/849,899, filed Sep. 4, 2007, entitled "RFID Tags and Systems." cited by other.

USPTO Transaction History of U.S. Appl. No. 11/849,941, filed Sep. 4, 2007, entitled "Method of Manufacturing an Enclosed Transceiver." cited by other.

Airco Coating Technology, "Airco Coating Technology Announces Contracts in its Toll Coating Program," press release, Fairfield, CA, Mar. 26, 1993 (copy submitted in parent U.S. Appl. No. 081947,681). cited by other.

Rizika, A., "Vapor Coating With SiO: the Flexible Glass Barrier," Pack Expo 92' Conference, Chicago III., Nov. 8-11, 1992 (copy submitted in parent U.S. Appl. No. 08/947,681). cited by other.

Ang, P., "Progress of QLF Barrier Coating," Airco Coating Technology, Concord CA, mailed by Airco to Mark Tuttle on Sep. 21, 1993 (copy submitted in parent U.S. Appl. No. 08/947,681). cited by other.

Pierce, C.W., "Epitaxy," VSLI Technology; S.M. Sze. Editor, McGraw-Hill Book Co., pp. 55, 1988,1983 (copy submitted in parent U.S. Appl. No. 08/947,681). cited by other.

\* cited by examiner

SYSTEM AND METHOD TO TRACK ARTICLES AT A POINT OF ORIGIN AND AT A POINT OF DESTINATION USING RFID

CROSS-REFERENCE TO RELATED APPLICATIONS

This application is a continuation of application Ser. No. 10/705,685, filed Nov. 10, 2003, now U.S. Pat. No. 7,158,031; which is a continuation of application Ser. No. 09/481,807 filed Jan. 11, 2000, now U.S. Pat. No. 6,741,178; a which is a divisional of application Ser. No. 08/934,701 filed Sep. 22, 1997, now U.S. Pat. No. 6,013,949; which is a continuation of application Ser. No. 08/610,236 filed Mar. 4, 1996, now abandoned; which is a continuation of application Ser. No. 08/168,909, filed Dec. 17, 1993, now U.S. Pat. No. 5,497,140; which is a continuation of application Ser. No. 07/928,899 filed Aug. 12, 1992, now abandoned, all of which are incorporated herein by reference.

TECHNICAL FIELD

This invention relates generally to electrically powered postage stamps and mailing labels which operate to transmit radio frequency (RF) identification signals to an interrogator either at the point of shipment origin, in transit, or upon reaching a point of destination. More particularly, this invention relates to such stamps and labels having an integrated circuit therein powered by a thin flat battery cell.

BACKGROUND

In application Ser. No. 07/889,777 entitled "Radio Frequency Identification Device and Method of Manufacture, Including an Electrical Operating System and Method", filed Jun. 17, 1992, now abandoned, there are disclosed and claimed new and improved radio frequency identification (RFID) tags which may be affixed to various articles (or persons) so that these articles, when shipped, may be easily tracked from the point of shipment origin, then along a given route, and then readily located upon reaching a point of destination. These RFID tags are constructed within a small area on the order of one inch (1") square or less and of a thickness on the order of 30 mils. These tags include, among other things, an integrated circuit (IC) chip having transmitter, receiver, memory and control logic sections therein which together form an IC transceiver capable of being powered by either a small battery or by a capacitor charged from a remote RF source. The IC chip including the RF transmitter and receiver sections operates to provide for the RF signal transmission and reception to and from remote sources, and a thin film antenna is also constructed within the above small area. The above novel RFID system operates to receive, store, and transmit article-identifying data to and from the memory within the IC chip. This data is stored within the IC chip memory stage and may be subsequently called up and transmitted to an interrogating party at the above point of origin, points along a given shipment route, and then upon reaching a point of destination. This application is assigned to the present assignee and is incorporated herein by reference.

The RFID device disclosed and claimed in the above identified application represents not only a fundamental breakthrough in the field of RF identification generally, but also represents significant specific advances over the prior art described in some detail in this application. This prior art includes relatively large hybrid electronic packages which have been affixed to railroad cars to reflect RF signals in order to monitor the location and movement of such cars. This prior art also includes smaller passive RFID packages which have been developed in the field of transportation and are operative for tracking automobiles. These reflective passive RFID packages operate by modulating the impedance of an antenna, but are generally inefficient in operation, require large amounts of power to operate, and have a limited data handling capability.

The above mentioned prior art still further includes bar code identification devices and optical character recognition (OCR) devices which are well known in the art. However, these bar code identification and OCR devices require labor intensive operation and tend to be not only very expensive, but highly unreliable.

SUMMARY

According to one embodiment of the present invention, a system is provided, which may alternatively be implemented as a method. The system comprises an article to be tracked; a flexible radio frequency identification (RFID) device coupled to the article, the RFID device comprising a first thin flexible sheet having a first surface, a dipole antenna disposed on the first sheet, and a single integrated circuit (IC) having stored therein an identification code associated with the article. The system further comprises an article tracking system configured to receive the identification code from an interrogation system, wherein the interrogation system includes a first interrogator located at a point of origin of the article, a second interrogator located at a point of destination of the article, and a third interrogator located on a route between the point of origin and the point of destination, and wherein the first, second, and third interrogators are configured to communicate with the RFID device to determine the identification code.

Figure 1:
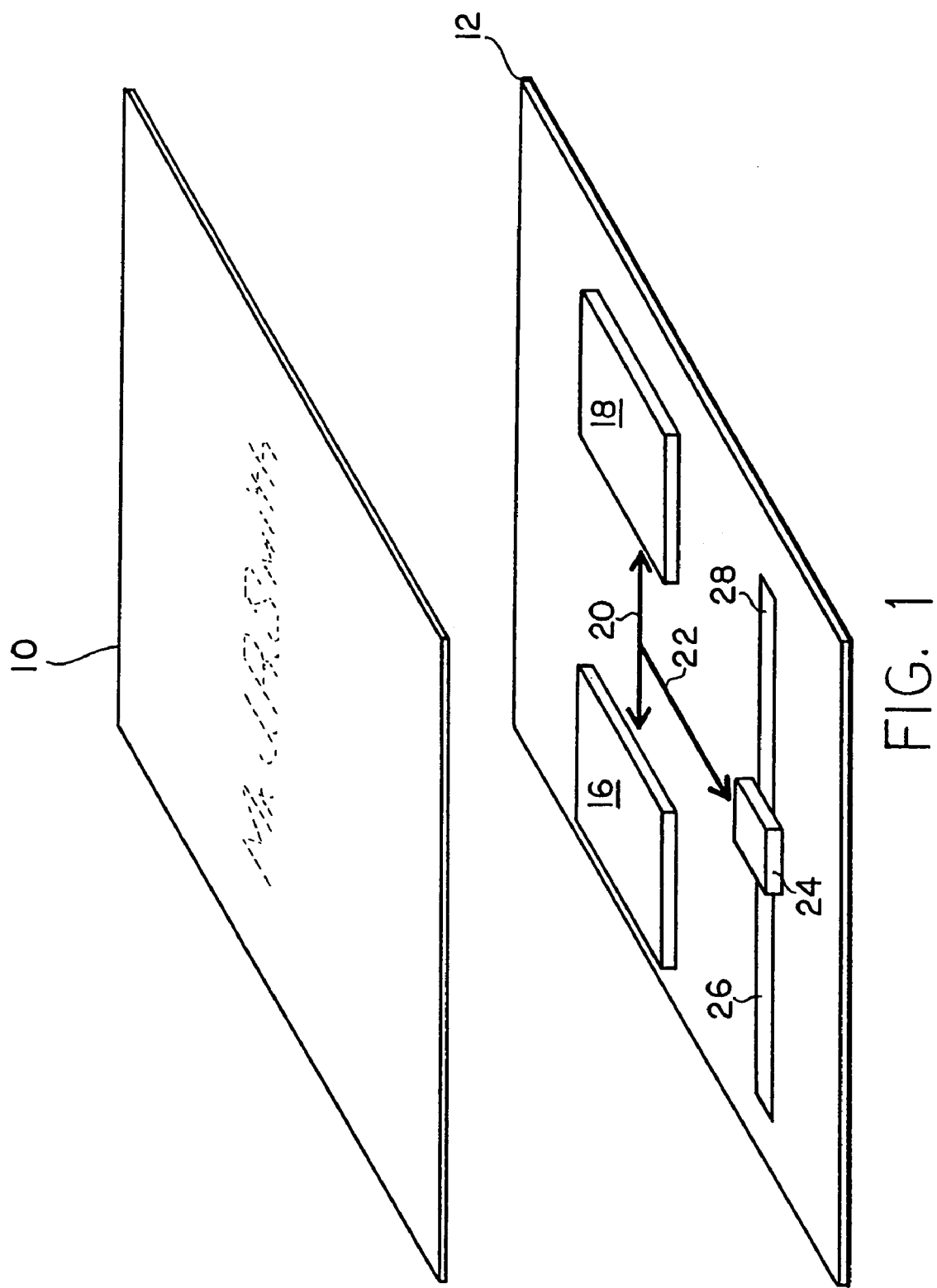
FIG. 1 is an exploded perspective view of the electrically powered mailing or shipping label embodiment of the invention, including the novel radio frequency identification system mounted on the label base member. However, it should be understood that there is no basic functional difference in the label and stamp embodiments of the invention, and that the label cover and label base members shown in FIG. 1 apply equally as well to the smaller stamp cover or stamp base members which, for sake of brevity, have not been shown in the drawings.
Figure 2:
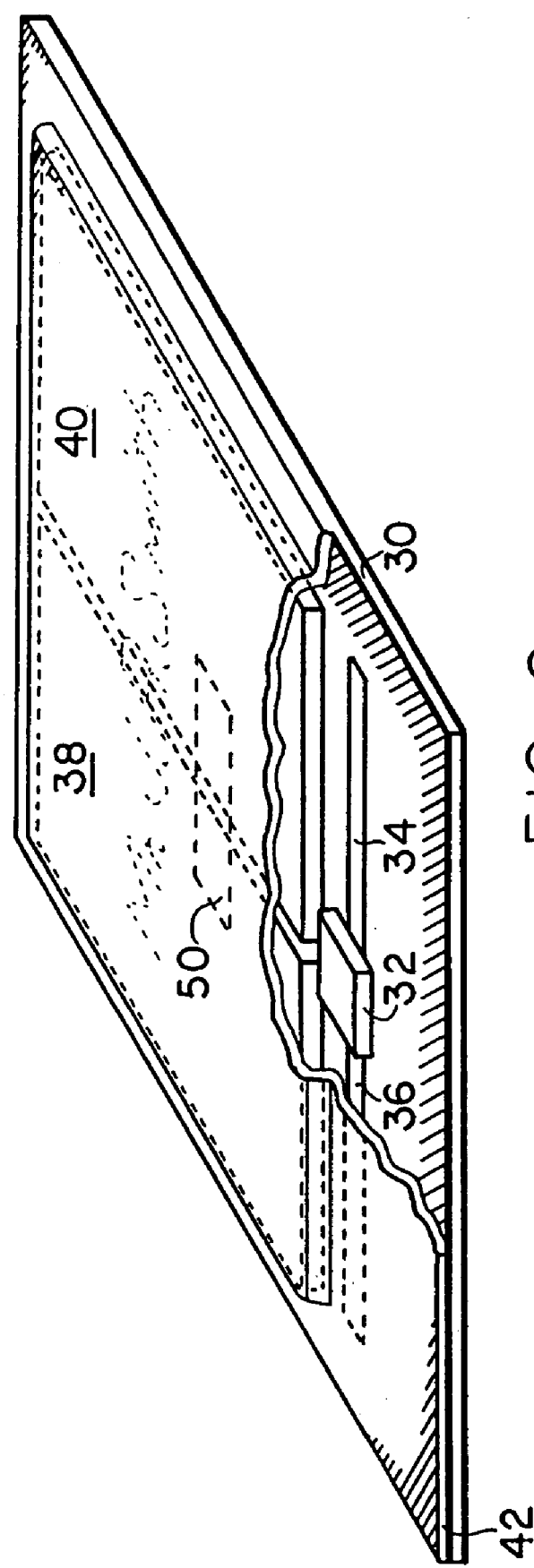
FIG. 2 is an enlarged perspective view of an RFID device and label or stamp package constructed in accordance with a preferred embodiment of the present invention.

These major signal processing stages are also used within the interrogation unit (not shown) which is operative to interrogate the IC chip shown in FIGS. 1 and 2 above.

Figure 7:
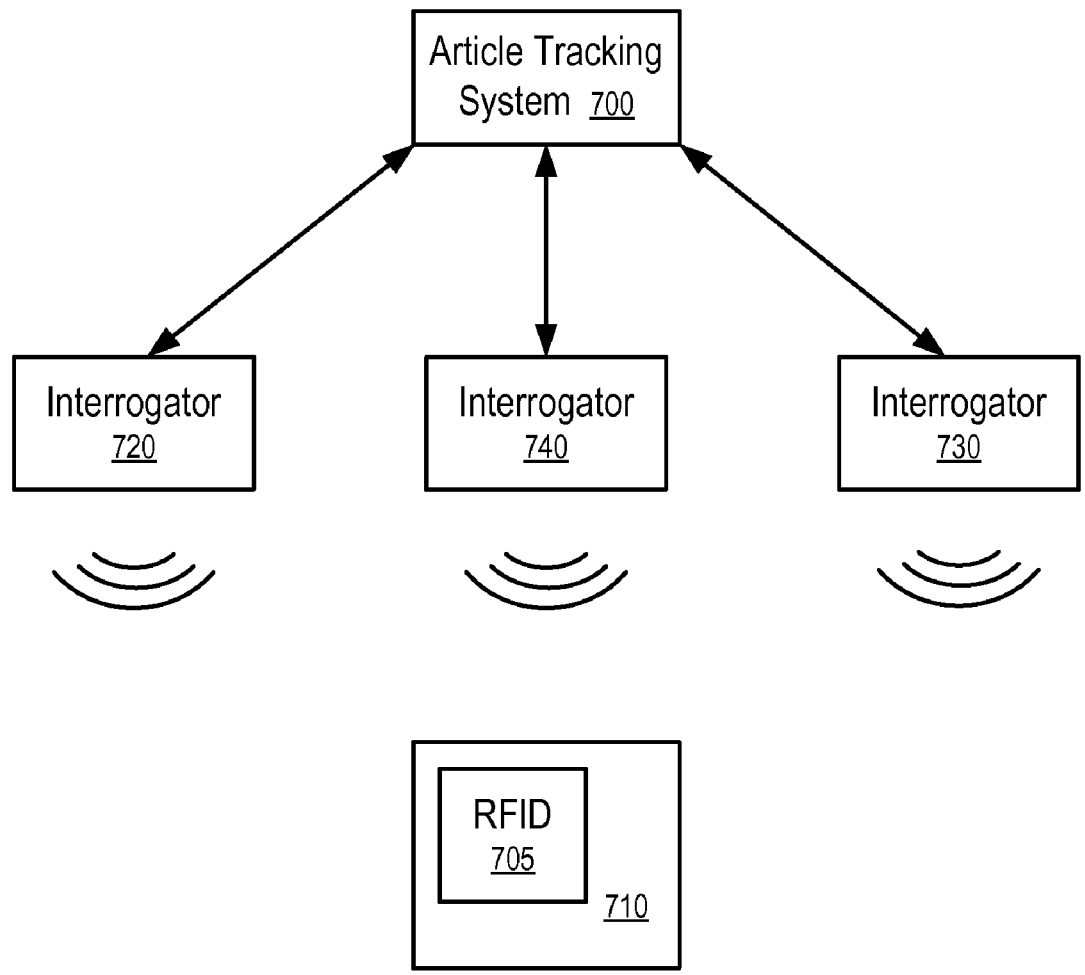

FIG. 7 illustrates an interrogation system in accordance with one embodiment.

DETAILED DESCRIPTION OF THE
ILLUSTRATED EMBODIMENTS

Referring now to FIG. 1, the electrically powered, RF operative label or stamp includes a cover member 10 and a base member 12 upon which a radio frequency identification system has been constructed using thin film deposition techniques of the type described in the above identified application Ser. No. 07/889,777 filed Jun. 17, 1992. Functionally speaking, the RFID system 14 will include one or more thin flat battery cells 16 and 18 which are connected in series as indicated by line 20 and are both connected via line 22 to drive an integrated circuit transceiver chip 24. The IC transceiver chip 24 will preferably be connected to a dipole antenna consisting of thin film antenna strips 26 and 28, and the dipole antenna 26 and 28 is operative to both transmit RF signals from the IC chip 24 to a controller and to receive incoming RF signals from an external RF source controller and operative to encode this data in IC chip memory in a manner more particularly described below with reference to FIG. 6. This data will typically include information on the article to which the label or stamp are affixed, such as an identification number, the sender's name, point of origin, weight, size, route, destination, and the like. In addition, the RFID system 14 may be used to automatically RF communicate with postage meters and with automatic sorting machines to thereby completely eliminate the need for human intervention for such automatic sorting, thereby greatly reducing automatic mail sorting costs while simultaneously greatly increasing the speed and accuracy of the mail sorting process.

The thin flat battery cells 16 and 18 can be made of various materials and typically include an anode, a collector, a cathode material, and a battery separator including a polymer and electrolytes of the type described below so as to not exceed a total battery thickness of 1 to 10 mils, while simultaneously being flexible and in some cases rechargeable. Furthermore, imminent commercialization of solid thin flat batteries having useful current levels at low temperatures makes the present invention commercially viable. Thus, since the IC chip 24 can also be made of thicknesses of no greater than 8 mils and since the thin film metal dipole antenna strips 26 and 28 may be held to thicknesses less than 1 to 2 mils, it is seen that the total added thickness between the label cover and base layers 10 and 12 will be negligible and not significantly affecting the bulk or the volume of the stamp or label into which the RFID system 14 is incorporated.

Referring now to FIG. 2, there is shown in a perspective view a preferred device embodiment of the present invention wherein the RFID tag includes a base support layer 30 upon which an integrated circuit chip 32 is disposed on the near end of the layer 30 and connected to a dipole antenna consisting of a pair of conductive strips 34 and 36 extending laterally from the chip 32. These conductive strips 34 and 36 will typically be screen printed on the upper surface of the base support layer 30.

A pair of rectangularly shaped batteries 38 and 40 are positioned as shown adjacent to the IC chip 32 and are also disposed on the upper surface of the base support member 30. The two rectangular batteries 38 and 40 are electrically connected in series to power the IC chip 32 in a manner more particularly described below. The device or package shown in FIG. 2 is then completed by the folding over of an outer or upper cover member 42 which is sealed to the exposed edge surface portions of the base member 30 to thereby provide a hermetically sealed and completed package. When the cover member 42 is folded over on the base member, the contact 50 which is attached to batteries 38 and 40 using conductive epoxy, provides the back side series electrical connection for the two batteries 38 and 40. The integrated circuit chip 32 has transmitter, memory, control, logic, and receiver stages therein and is powered by the two batteries 38 and 40 during the transmission and reception of data to and from an interrogator to provide the interrogator with the various above information and identification parameters concerning the article, animal or person to which the RFID tag is attached.

Figure 3:
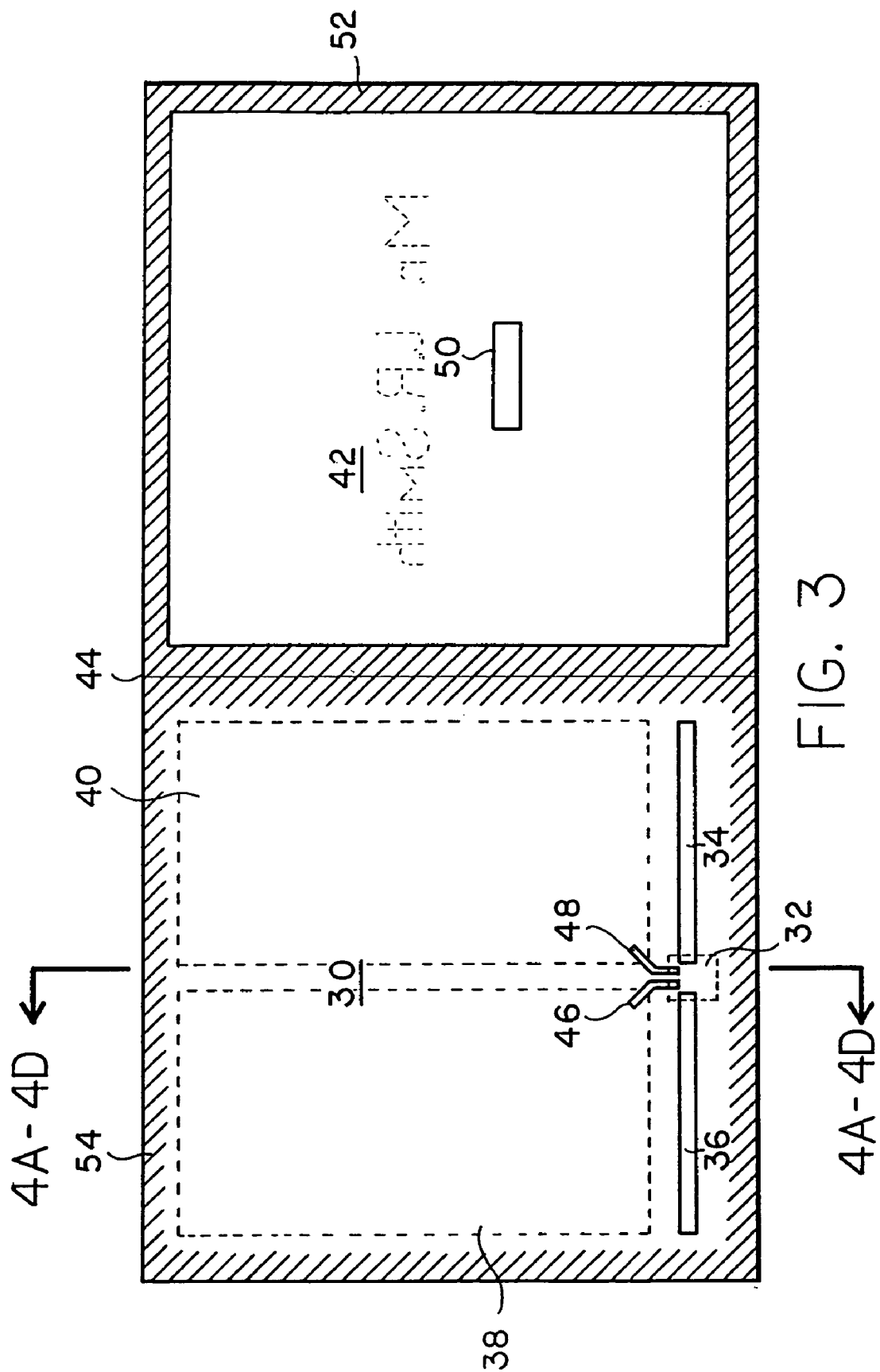
FIG. 3 is a plan view showing the conductive patterns on the base and cover members used in FIG. 2, including dotted line outlines for the locations of the IC chip and batteries which form the FIG. 2 structure.

Referring now to FIG. 3, there is shown a plan view of the geometry of the base support member 30 and the cover member 42 which, during the initial manufacturing stage for the RFID device, are joined at an intersecting line 44. The dipole antenna strips 34 and 36 are shown positioned on each side of the IC chip 32, and the two conductive strips 46 and 48 serve to connect the tops of the batteries 38 and 40 into the IC chip 32. A conductive strip 50 is provided on the upwardly facing inside surface of the top cover 42, so that when the cover 42 is folded by 180 degree at intersecting line 44, its outer boundary 52 is ready to be sealed with the outer boundary 54 of the base support member 30. Simultaneously, the conductive strip 50 bonded by the conductive epoxy to the batteries 38 and 40, completes the series electrical connection used to connect the two batteries 38 and 40 in series with each other and further in the series circuit with the integrated circuit chip 32 through the two conductors 46 and 48.

Figure 4A:
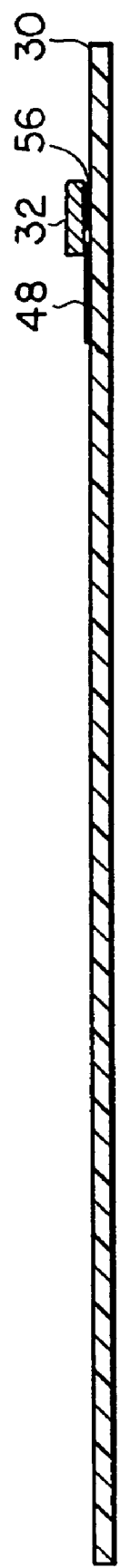
FIGS. 4A through 4D are cross sectional views taken along lines 4-4 of FIG. 3 showing the four (4) major processing steps which are used in constructing the RFID device and system array in accordance with a preferred process embodiment of the invention.

Referring now to FIGS. 4A through 4D taken at the 4A-D cross section indicated in FIG. 3, FIG. 4A shows in cross section view the IC chip 32 bonded to the base support member 30 by means of a spot or button of conductive epoxy material 56. The conductive strip 48 is shown in cross section on the upper surface of the base support member 30.

Figure 4B:
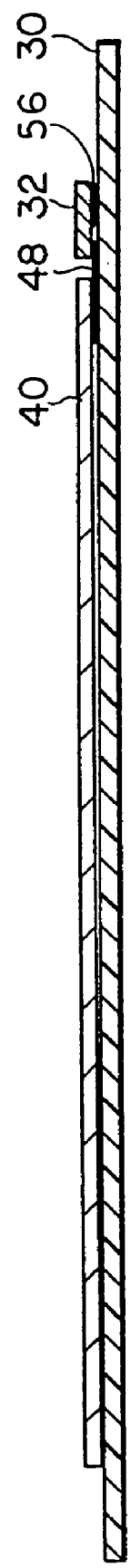

Referring now to FIG. 4B, the battery 40 is aligned in place as indicated earlier in FIG. 2 and has the right hand end thereof bonded and connected to the upper surface of the conductive strip 48 by means of a spot of conductive epoxy applied to the upper surface of the conductive strip 48, but not numbered in this figure.

Figure 4C:

Referring now to FIG. 4C, a stiffener material 58 is applied as shown over the upper and side surfaces of the IC chip 32, and the stiffener material will preferably be an insulating material such as "glob-top" epoxy to provide a desired degree of stiffness to the package and protection for the integrated circuit as completed.

Figure 4D:
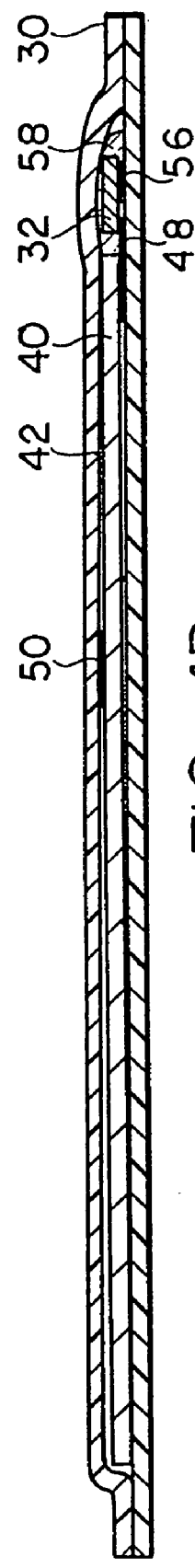

Next, a spot of conductive epoxy is applied to each end of the conductive strip 50, and then the cover layer material 42 with the conductive epoxy thereon is folded over onto the batteries 38 (of FIG. 2) and 40 and the base member 30 to cure and heat seal and thus complete and seal the package in the configuration shown in FIG. 4D. This figure corresponds to the remaining stations 22, 24, and 26 in FIG. 1.

Figure 5:
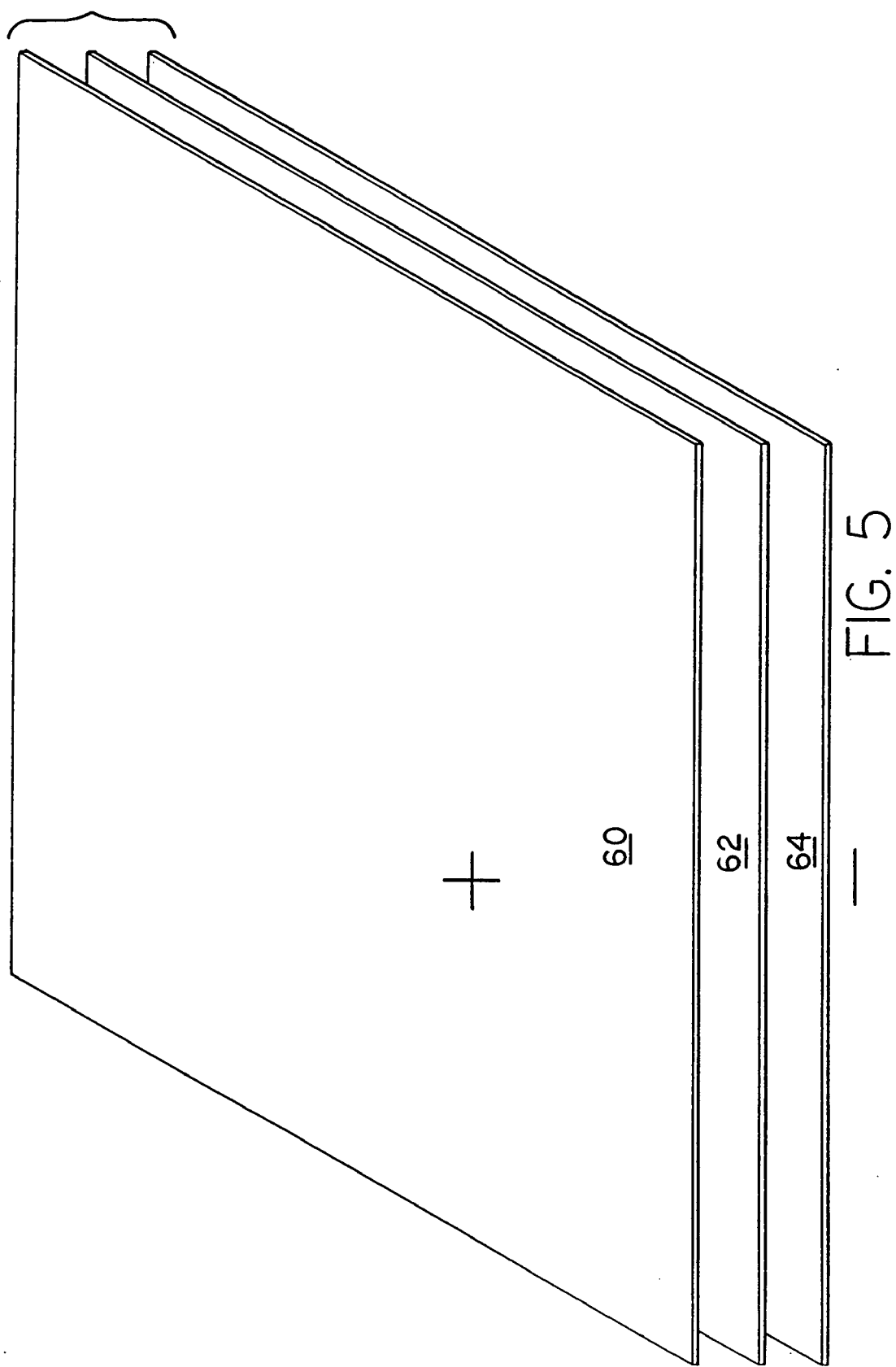
FIG. 5 is a greatly enlarged perspective view of one suitable, very thin lithium/vanadium-oxide/copper battery or cell useful in the label and stamp embodiments and perspective views shown in FIGS. 1 and 2 above.

Referring now to FIG. 5, there is shown in a greatly enlarged perspective view a lithium/vanadium-oxide/copper battery including a lithium anode 60 as a top plate for the battery, an intermediate polymerized vanadium oxide electrolyte and separator layer 62 and a copper collector 64. However, the layer 62 is not limited to the use of vanadium oxide ($V_2O_5$ or $V_6O_{13}$), but may use other oxides such as magnesium oxide, $MnO_2$. The intermediate layer 62 is formed and polymerized on the upper surface of the copper collector 64 and may be obtained from outside manufacturers or vendors as a one piece sheet (62, 64) and then assembled in house with lithium top anode sheets. Alternatively, the thin flat battery structure shown in FIG. 5 may be obtained as a completed battery cell from outside vendors or manufacturers. The thickness of these thin flat batteries will typically be in the range of 1 to 10 mils, and as previously indicated may be made as thin as a fraction of a mil. The components are assembled in an argon or other inert dry atmosphere using state of the art thin dry cell fabrication techniques. The use of conductive polymer layers as separators in thin flat battery cells is generally known in the art and is described, for example, in an article by M. G. Kanatzibis entitled "Conductive Polymers", Chemical and Engineering News—American Chemical Society, Dec. 3, 1990, incorporated herein by reference.

Figure 6:
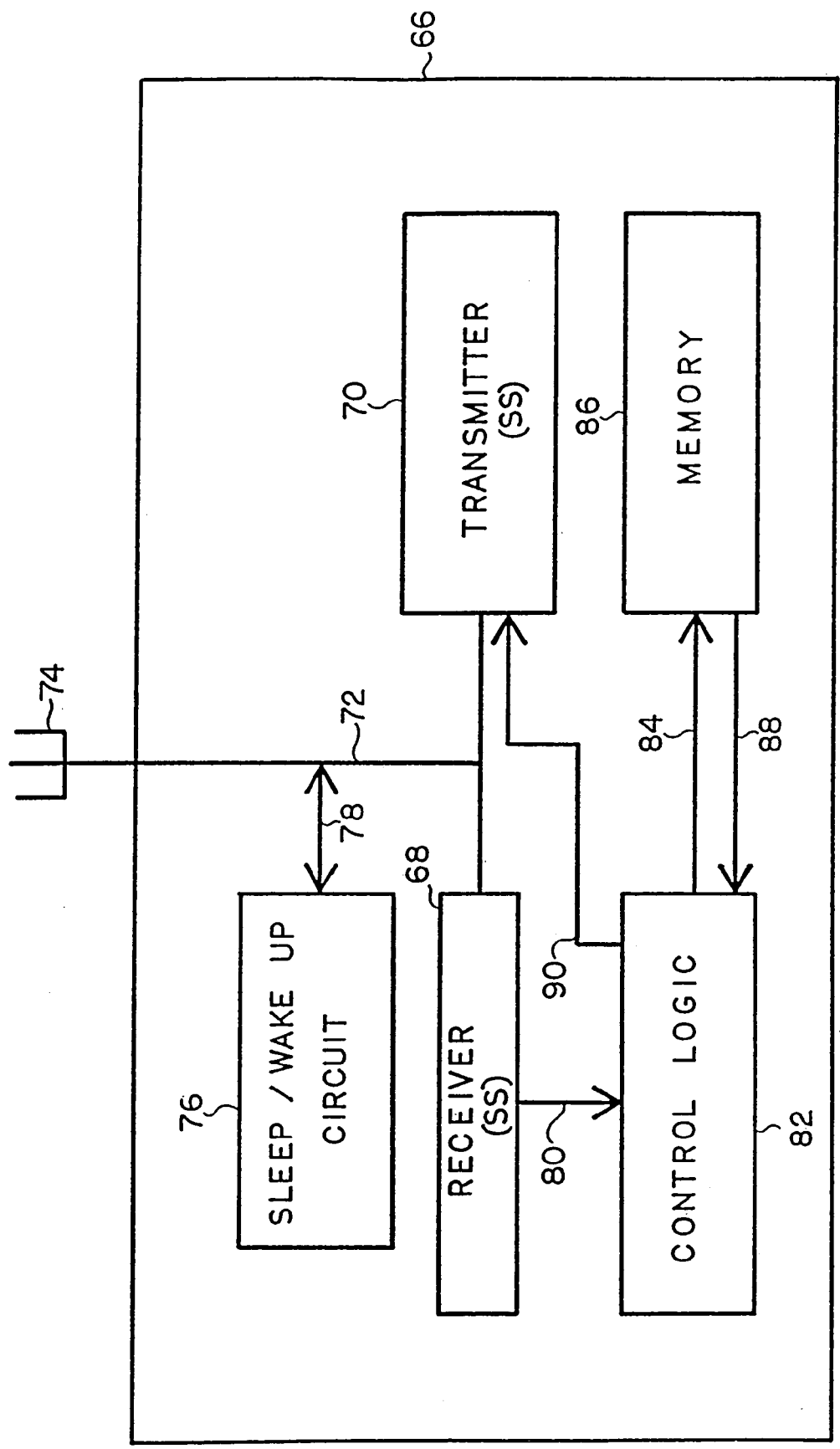
FIG. 6 is a functional block diagram showing the major signal processing stages within the RFID integrated circuit chip described herein and shown in FIGS. 1 and 2 above.

Referring now to FIG. 6, the rectangular outer boundary 66 in this figure defines the active area on the integrated circuit chip (e.g. 24 in FIG. 1) in which the novel integrated circuit transceiver has been formed using state of the art MOS planar processing techniques. These MOS planar processing techniques are well known in the art and are, therefore, not described in detail herein. Within the chip active area 66 there is provided an RF receiver stage 68 and an RF transmitter stage 70, both connected through a common line or connection 72 to an off-chip antenna 74 of any planar type. A sleep/wake up circuit 76 is also connected via line 78 to the antenna 74 and operates in response to signals received from the antenna 74 to activate the necessary remaining circuitry and stages on the IC chip 66 described below.

The receiver 68 is connected through a line 80 to a control logic stage 82, and a first output line 84 from the control logic stage 82 is connected as an input to the memory stage 86. A return output line 88 from the memory stage 86 connects back to the control logic stage 82, and a second output line 90 from the control logic stage 82 connects as a second input to the transmitter 70 for providing memory or stored input data to the transmitter 70 via the control logic stage 82. In a data encoding operation, the data received concerning ID number, name, route, destination, size, weight, etc., is processed through the receiver 68 and through the control logic stage 82 and encoded into the memory stage 86.

As an example of a data call-up operation, when the RFID package in the above figures is placed on the outside surface of a piece luggage by the airlines or on a package for shipment by the postal service, either the airline agent or the postal worker will transmit information to the receiver 68 via an RF communication link concerning data such as the owner's name ID number, point of origin, weight, size, route, destination, and the like. This information received at the receiver stage 68 is then transmitted over line 80 and through the appropriate control logic stage 82 which sorts this information out in a known manner and in turn transmits the data to be stored via lines 84 into a bank of memory 86. This data is stored here in memory 86 until such time that it is desired to call up the data at one or more points along the shipment route. In one embodiment illustrated in FIG. 7, an article tracking system 700 is configured to receive from an interrogation system, an identification code of an RFID device 705 attached to an article 710, wherein the interrogation system comprises a first interrogator 720 at an originating location of the article, a second interrogator 730 at a final location of the article, and a third interrogator 740 on a route between the originating location and the final location, and wherein the interrogation system is configured to communicate with the RFID device to determine the identification code.

For example, upon reaching a point of shipment destination, an interrogator may want to call up this data and use it at the point of destination for insuring that the item of shipment or luggage is most ensuredly and efficiently put in the hands of the desired recipient at the earliest possible time. Thus, an interrogator at the destination point will send interrogation signals to the RFID chip 66 where they will be received at the antenna 74 and first processed by a sleep/wake up circuit 76 which operates to bring the FIG. 6 circuitry out of the sleep mode and allow the receiver stage 68 to process this received data to the control logic stage 82 via line 80. At the same time, the requester will be operating an interrogation electronic unit having therein the same circuitry as that shown in FIG. 6, less the sleep/wake up circuit 76.

With all stages in the FIG. 6 circuitry now awake, the memory stage 86 will produce the above six pieces of information relating to the shipped article and generate this data on line 88 and back through the control logic stage 82 into the transmitter 70 so that the transmitter 70 can now transmit this data to the interrogator.

The receiver and transmitter sections 68 and 70 in FIG. 6 will preferably be operated in one of the well known spread spectrum (SS) modes using one of several available SS types of modulation which include: (1) direct sequence, (2) frequency hopping, (3) pulsed FM or chirped modulation, (4) time hopping, or time-frequency hopping used with pulse amplitude modulation, simple pulsed amplitude modulation or binary phase shift keying. The spread spectrum mode of operation per se is generally well known in the art and must conform to the frequency band separation requirements of the FCC Regulations, Part 15, incorporated herein by reference. The circuitry for the interrogation unit (not shown) will be similar to the functional system shown in FIG. 6 as will be understood by those skilled in the art, and therefore the interrogation unit will not be described herein.

Various modifications may be made in and to the above described embodiment without departing from the spirit and scope of this invention. For example, various modifications and changes may be made in the antenna. configurations, battery arrangements (such as battery stacking), device materials, device fabrication steps, and the system block diagram in FIG. 6 without departing from the scope of this invention. In addition, the various off chip components such as the antenna, battery, capacitor, and even inductors can be manufactured on-chip within the claims herein. In the case where RF charging is used, a battery will not be required. Accordingly, these and other constructional modifications are within the scope of the following appended claims.

In addition, still other modifications may be made in and to the above described cell fabrication and device fabrication procedures without departing from the spirit and scope of this invention. For example, the present invention is not limited to the use of any particular types of thin flat battery cells or materials or cell fabrication processes, nor is it limited to the particular preferred fabrication technique for the RFID system as shown in FIGS. 2, 3, and 4 above. Moreover, the present invention is not strictly limited to the use of radio frequency communication and may, in environments where RF signals are not allowed, be modified so that the IC chip transceiver is capable of communicating with light waves using certain state of the art electro-optical coupling techniques which are not described herein, but are clearly within the scope of the following appended claims.

Finally, it will be understood and appreciated by those skilled in the art that the present invention also includes forming an optical detector on the IC chip as a means of receiving and detecting signals carried by light and also as a means of powering the RFID transceiver as an alternative to using a battery. Accordingly, these and other systems and constructional modifications are clearly within the scope of the broad claims filed herein.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

I claim:

1. A system, comprising:
   an article to be tracked;
   a flexible radio frequency identification (RFID) device coupled to the article, the RFID device comprising a first thin flexible sheet having a first surface, a dipole antenna disposed on the first sheet, and a single integrated circuit (IC) having stored therein an identification code associated with the article; and
   an article tracking system configured to receive the identification code from an interrogation system, wherein the interrogation system includes a first interrogator located at a point of origin of the article and a second interrogator located at a point of destination of the article, and wherein the first and second interrogators are configured to communicate with the RFID device to determine the identification code.

2. The system of claim 1, wherein the first sheet is less than approximately 5 mils thick.

3. The system of claim 2, wherein the IC is disposed on the first sheet and wherein the article tracking system comprises at least the first interrogator.

4. The system of claim 1, wherein the tracking system is configured to determine description information associated with the article.

5. The system of claim 4, wherein the tracking system is configured to determine source information associated with the article.

6. The system of claim 5, wherein the description information and the source information are stored in the IC.

7. The system of claim 1, wherein the RFID device is configured to communicate using at least one of an amplitude or phase shift keying modulation technique.

8. The system of claim 7, wherein the first, second, and third interrogators are configured to communicate with the RFID device using a spread spectrum signal that performs frequency hopping.

9. A system, comprising:
   a first article;
   a first RFID device affixed to the first article and comprising a first thin polymer sheet having a first surface, an antenna disposed on the surface, and a single integrated circuit (IC) coupled to the antenna; and
   an article tracking system configured to provide access to location information associated with the article from an interrogation system, wherein the interrogation system comprises a first interrogator at an originating location of the article, a second interrogator at a final location of the article, and a third interrogator on a route between the originating location and the final location, and wherein the interrogation system is configured to communicate with the first RFID device to determine an identification code associated with the first article.

10. The system of claim 9, wherein the sheet is less than approximately 5 mils thick.

11. The system of claim 9, wherein the antenna of the first device is a dipole antenna.

12. The system of claim 9, wherein the tracking system is configured to associate the identification code with the first article and wherein the tracking system comprises the first, second, and third interrogators.

13. The system of claim 12, wherein the interrogation system is configured to associate the identification code with the first article by encoding the identification code in the first device.

14. The system of claim 12, wherein the tracking system is configured to determine description information associated with the first article.

15. The system of claim 14, wherein the description information is stored in the first device.

16. The system of claim 9, wherein the interrogation system is configured to provide power to the first device by RF charging.

17. The system of claim 9, wherein the device further comprises a battery and wake up circuitry configured to awaken the IC from a sleep mode upon detecting a predetermined signal via the antenna.

18. The system of claim 17, wherein the battery is less than approximately 30 mils thick.

19. A method of tracking articles, comprising:
    providing an RFID device comprising a first thin flexible sheet having a first surface, an antenna disposed on the first sheet, and a single integrated circuit (IC) coupled to the antenna;
    coupling the device to an article;
    reading the device electronically at a shipment origin to determine at least a portion of identifying information associated with the article, the at least portion of the identifying information including an identification code;
    shipping the article to a shipment destination; and
    receiving the at least portion of identifying information when the device is electronically read at the shipment destination.

20. The method of claim 19, further comprising storing the identification code in the IC.

21. The method of claim 20, wherein reading the device includes interrogating the device using a spread spectrum RF signal in a range of 800 MHz to 8 GHz.

22. The method of claim 21, wherein the first sheet is less than approximately 5 mils thick.

23. The method of claim 19, wherein reading the device includes interrogating the device using a frequency hopping spread spectrum RF signal.

24. The method of claim 19, wherein reading the device comprises providing power to the device by RF charging.

25. The method of claim 19, wherein the device comprises a battery, and reading the device comprises transmitting an RF signal and waking up the IC from a sleep mode in response to detecting the signal.

26. A method of tracking articles, comprising:
    receiving a plurality of articles at a shipment destination, each of the articles having affixed thereto a respective RFID device comprising a respective thin sheet, a respective antenna disposed on the sheet, and a single respective integrated circuit (IC) coupled to the antenna;
    transmitting to the articles an RF signal;
    receiving, in response to the signal, data stored in a first IC of a first RFID device affixed to a first article of the plurality of articles;
    providing access to a tracking system that receives the data from the first RFID device from a first interrogator at an original location of the article and from a second interrogator at a location along a route between the original location and the shipment destination; and treating the first article based at least in part on the data received from the first RFID device.

27. The method of claim 26, further comprising providing power to the first device by RF charging, and wherein the RF signal in a range of 800 MHz to 8 GHz.

28. The method of claim 26, wherein the sheet is less than approximately 5 mils thick.

29. The method of claim 26, further comprising determining a source of the first article from the data, the data including an identification code.

30. The method of claim 26, further comprising waking up the first IC from a sleep mode in response to the RF signal, wherein the first IC is coupled to a battery.

* * * * *